March 11, 1958   A. W. WOODWARD   2,825,961
METHOD OF FORMING AN INTEGRAL RIM
Filed Nov. 23, 1953   4 Sheets-Sheet 1

INVENTOR.
ALVA W. WOODWARD
BY
*P. L. Miller*
ATTORNEY

March 11, 1958  A. W. WOODWARD  2,825,961
METHOD OF FORMING AN INTEGRAL RIM
Filed Nov. 23, 1953  4 Sheets-Sheet 2

INVENTOR.
ALVA W. WOODWARD
BY
ATTORNEY

March 11, 1958     A. W. WOODWARD     2,825,961
METHOD OF FORMING AN INTEGRAL RIM
Filed Nov. 23, 1953     4 Sheets-Sheet 3

INVENTOR.
ALVA W. WOODWARD
BY
*R. L. Miller*
ATTORNEY

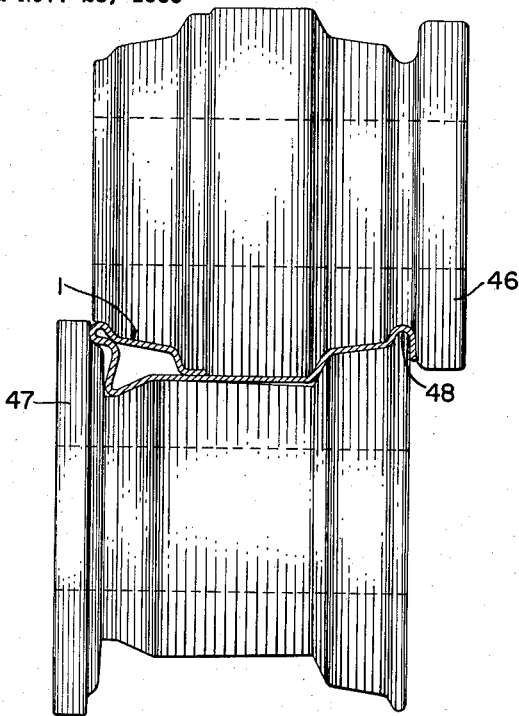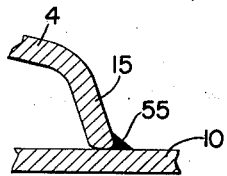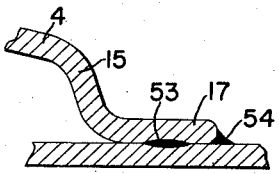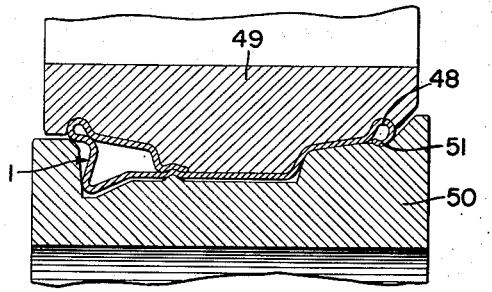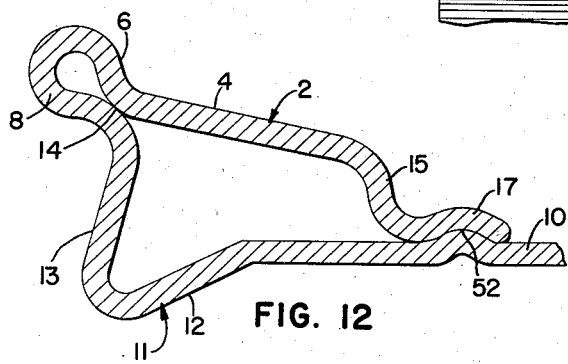

United States Patent Office 2,825,961
Patented Mar. 11, 1958

2,825,961

METHOD OF FORMING AN INTEGRAL RIM

Alva W. Woodward, Kent, Ohio, assignor, by mesne assignments, to The Goodyear Tire & Rubber Company, a corporation of Ohio Application November 23, 1953, Serial No. 393,713

5 Claims. (Cl. 29—159.1)

This invention relates to a new rim construction for use with pneumatic tires and the method for making the rim. More particularly it relates to a one-piece rim for use with tubeless tires and new and novel method for forming the rim from an annular band of material.

Tubeless tires are coming into widespread use and as a result, changes and modifications are necessary in the present rim constructions, particularly multiple-piece truck rims to adapt them to use with tubeles tires. It is a requirement of any rim that is to be used with a tubeless tire that it be airtight when the tire is mounted on the rim. This presents many problems with the usual multiple-piece truck rims and a one-piece rim is one solution.

A one-piece rim to be acceptable to the trade requires that it be interchangeable in mounting with the present multiple-piece rims so that a truck operator may replace his present usual tire and tube assembly with a tubeless tire without it being necessary to obtain new wheels. The present invention provides a one-piece rim with a rim mounting surface that is interchangeable with the usual gutter edge mounting of the conventional rims. It is therefore an object of the invention to provide a rim for use with tubeless tires that is interchangeable with the present rims.

Another object of this invention is to provide a rim that may be economically formed and relatively low in cost.

A still further object of the invention is to provide a new and novel method of forming rims.

Another particular object of the invention is to provide a rim that provides an airtight rim without the use of separate sealing elements.

Other objects and advantages will become apparent hereinafter as the description thereof proceeds, the novel features, arrangements and combinations being clearly pointed out in the specification as well as in the claims thereunto appended.

In the drawings:

Fig. 10 is a partial section of the first rolling operation;

Fig. 11 is a partial section of the second rolling operation;

Fig. 12 is an enlarged partial section of another form of the rim;

Fig. 13 is an enlarged partial section of a modified form of the rim; and

Fig. 14 is an enlarged partial section of another modification of the invention.

In the present invention an annular band first is formed from a flat strip of steel by circling and butt welding the ends together in the usual manner. This annular band is then shaped by a series of forming and rolling operations to produce a rim that has bead seats and retaining flanges along each edge and a rim-mounting surface about the inner periphery adjacent one of the edges. The rim is formed so that there is no possibility of the air pressure in a tire mounted on the rim to escape through any portion of the rim. Hot rolled deep drawing steel of approximately $3/16''$ gauge has been found to be satisfactory for forming rims by this method.

Figure 1:
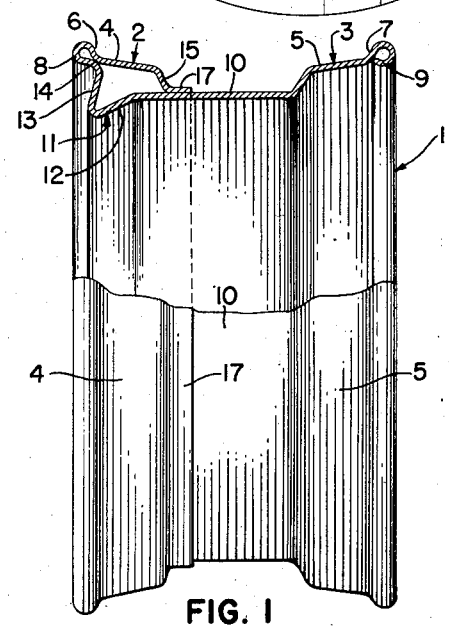
Fig. 1 is a partial sectional view of a completed rim.

The rim 1 as formed is illustrated in Fig. 1 with bead-mounting means 2 and 3 along the edges thereof. The bead-mounting means include bead seats 4 and 5 adapted to receive the inner periphery of the beads of the tire (not shown) when mounted on the rim and bead-retaining flanges 6 and 7 in the form of rolled edges 8 and 9 extending substantially radially outwardly from the axial outer edges of the bead seats. The center portion 10 of the rim is of a smaller diameter (drop center rim) than that of the bead seats 4 and 5 and along one edge the portion 10 a radially inwardly extending rim-mounting portion 11 is formed. The rim-mounting portion 11 is of the same contour as the gutter edge of a conventional multiple piece rim so that the rim 1 of the present invention may be mounted interchangeably with a conventional multiple-piece rim. The rim-mounting portion 11 is formed of radially inwardly inclined portion 12 extending generally axially and outwardly toward the edge from the center portion 10 and a substantially radially outwardly extending portion 13 which joins the edge of the rolled bead-retaining flange 6 at 14. This forms a substantially closed cavity between the bead-mounting means 2 and the rim-mounting means 11. At this point, the portion 13 of the rim-mounting means 11 contacts the inner side of the axial outward peripheral edge of the head seat 4 at 14 to prevent any collapsing of the bead seat 4. The inner edge of the bead seat 4 is supported by a portion 15 extending substantially radially inwardly from the bead seat to the inner portion 10 of the rim and portion 17 and in the preferred form, extending for a short distance axially inwardly and in contact with the inner portion 10. The portion 17 may be omitted if desired to leave the end of the portion 15 resting against the periphery of inner portion 10 of the rim.

In the drawings a blank of sheet steel 18 is circled and butt welded as at 19 to form an annular band 20 of the desired diameter according to the usual rim manufacturing procedure. It is essential that the weld 19 be airtight so as to prevent loss of air pressure through the weld when a tire is mounted on the rim and also the weld necessarily must be ductile so that it will not rupture during the forming of the rim.

Figure 2:
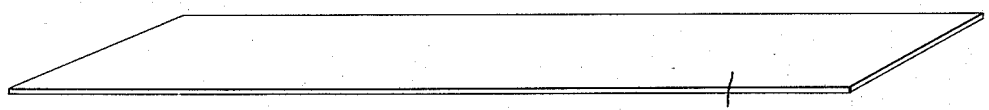
Fig. 2 is a diagrammatic illustration of a strip of metal stock.
Figure 3:
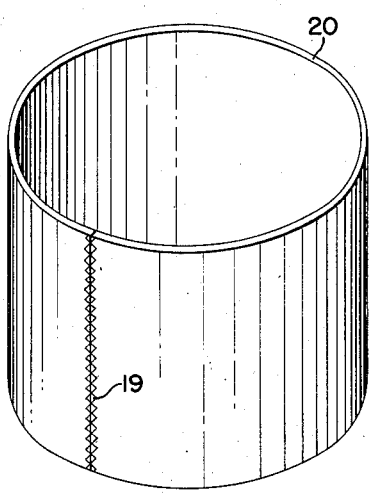
Fig. 3 represents diagrammatically the stock prepared for forming.
Figure 4:
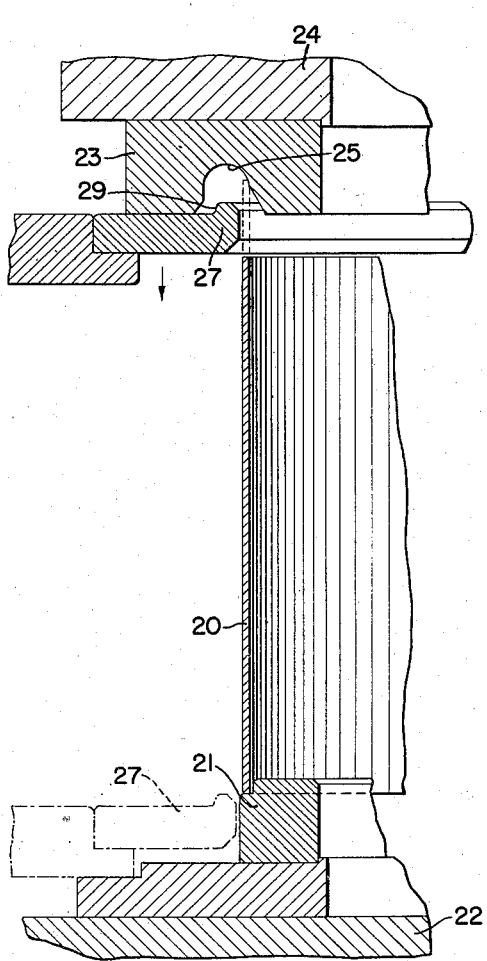
Fig. 4 is a partial section of the first step of the forming.
Figure 5:
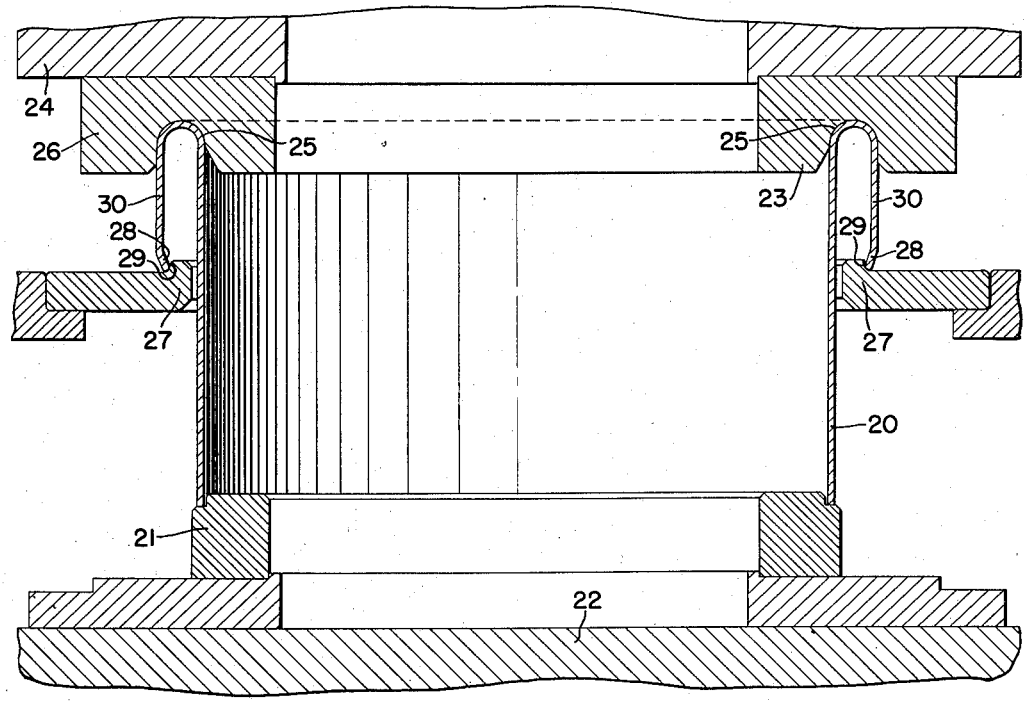
Fig. 5 is a section at the completion of the first step of the forming.

In the first forming operation, the annular band 20 is placed upon a bottom die 21 which is mounted on a lower platen 22 of a high pressure platen press. The upper die 23 mounted on the upper platen 24 of the press has an inverted U-shaped cavity 25 therein. As the upper platen 24 moves toward the lower platen 22 the band 20 contacts the inside periphery of the U-shaped cavity 25 which causes the edge of the band 20 to curl outwardly and then toward the opposite edge portion of the band as best shown in Fig. 5. In order to assist in maintaining the turned portion 26 of the band substantially parallel to the band 20, guide means 27 is raised into the position shown in Fig. 4 when the band is placed in the press. As the upper platen 24 is moved toward the lower platen 22 during the first forming operation the guide means 27 is lowered simultaneously so that the end 28 of the turned-out portion of the band is in contact with the shoulder 29 of the guide so that the end 28 cannot move inwardly toward the band 20. At the end of this operation the guide means drops to the position indicated by the dotted lines in Fig. 4, and the band 20 with the U-shaped edge is removed from the press.

Figure 6:
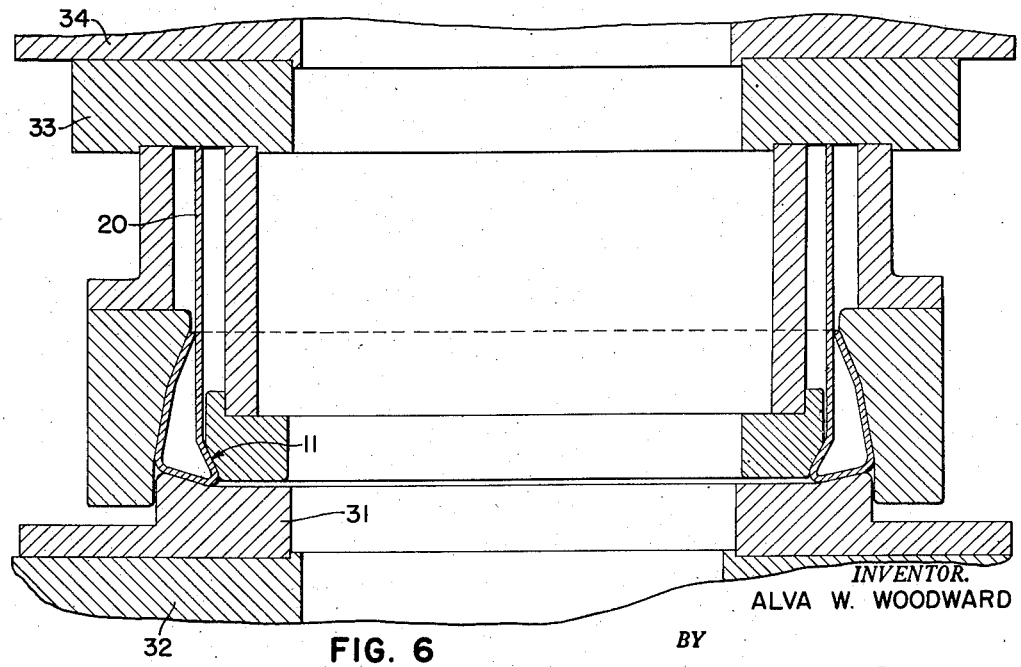
Fig. 6 is a section of the second forming step.

As illustrated in Fig. 6 the U-shaped edge 30 of the band next is placed on a lower forming die 31 mounted on the lower platen 32 of a similar platen press. This press may be the same press used for the first forming operation but preferably another press is used to eliminate the necessity of changing dies for the various operations. The upper die 33 mounted on the upper platen 34 as it moves toward the lower platen 32 contacts the end of the band 20 and upsets the U-shaped edge portion 30 against the die 31 to form the rim-mounting portion 11 from the U-shaped portion 30 of the band. The remaining portion of the U-shaped edge 30 of the band is formed so as to angularly approach the outer periphery of the band 20.

Figure 7:
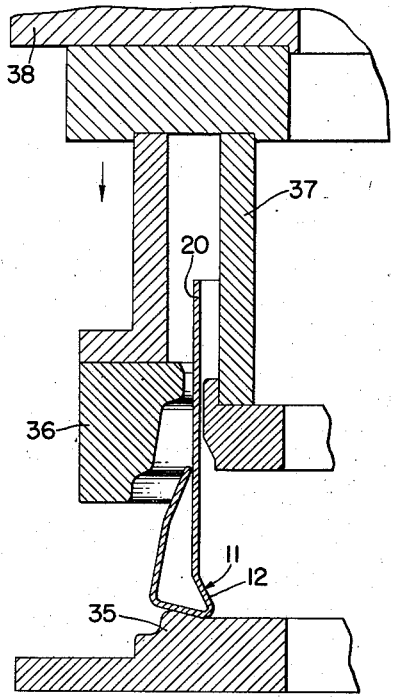
Fig. 7 is a partial section at the beginning of the third forming step.
Figure 8:
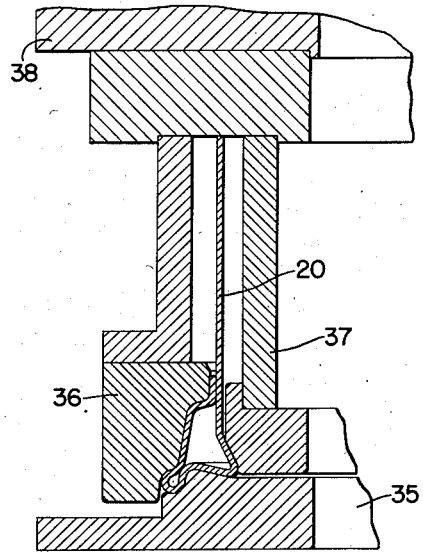
Fig. 8 is a partial section at the completion of the third forming step.

As illustrated in Figs. 7 and 8, the upset portion of the band is subsequently positioned on a bottom die 35 mounted on lower press platen (not shown) which registers the band by the rim with the inclined portion 12 of the rim-mounting portion 11. Upper dies 36 and 37 mounted on the upper platen 38 of the press engage the opposite sides of the formed portion of the band as the upper platen moves toward the lower platen to form the edge portion to include the bead-mounting means 2 and rim-mounting surface 11.

Figure 9:
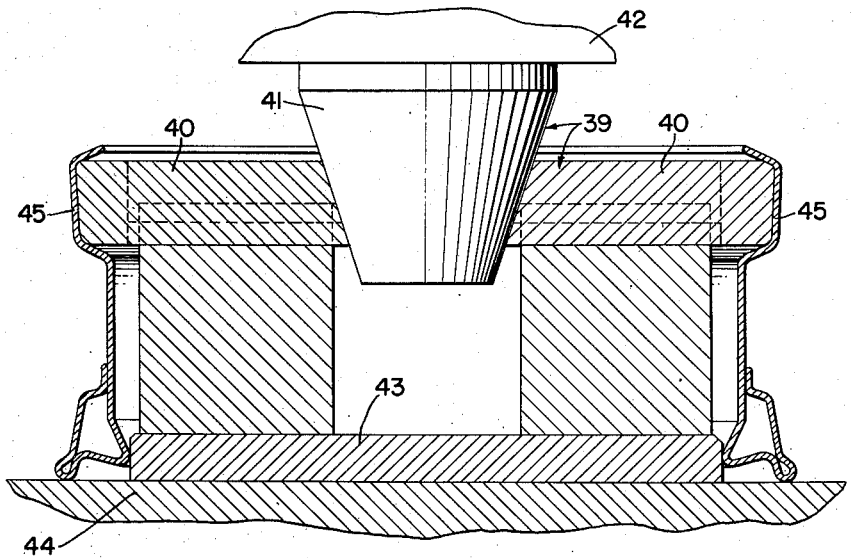
Fig. 9 is a section of a further step of the forming operation.

In order to form bead-mounting means 3 on the opposite edge of the band it is necessary to expand this edge to approximately the diameter required for bead seat 5. Conical expanding die 39, seen in the expanded position in Fig. 9, including similar sections 40 and expanding cone 41 is mounted on the upper platen 42 of a platen press. The inner periphery of rim-mounting portion 11 is centered over the locating die 43 mounted on the lower platen 44 of the press. As the press is closed the cone 41 moves the sections 40 outwardly to expand the portion of the band 45 adjacent the opposite lateral edge of the band. The cone is then withdrawn and the sections 40 return to the original position.

In Fig. 10 the annular band is then placed between forming rolls 46 and 47. Pressure is applied forcing the rolls toward each other and then rotated according to well-known practices in rim manufacturing to form an inverted U-shaped portion 48 along the outer edge of the expanded portion.

In Fig. 11 the forming rolls 49 and 50 are operated in a similar manner to curl the outer leg 51 of the U portion 48 inwardly so that it substantially is in contact with the band. The rim 1 is now completely formed but in most instances will require a sizing operation to provide a rim within the required tolerances.

The rim may be sized by any of the methods which are well known in rim manufacturing operations. For example, after completing the second rolling operation the rim may be expanded slightly then shrunk to the desired size or the steps may be reversed, shrunk first then expanded to the desired size. It is also possible that shrinking or expanding alone will provide a rim of the desired size.

In a modification of the invention, as shown in Fig. 12, the inner portion 10 of the rim and contiguous portion 17 have a mutually extending hump 52 formed therein. The hump 52 may be formed in either of the two rolling operations shown in Figs. 10 or 11 by making the necessary modification to the rolls. The hump 52 provides an easily formed means of preventing any relative movement between the portion 10 of the rim and the bead seat 4.

Another means of preventing lateral movement between the portion 10 of the rim and the bead seat 4 is illustrated in Fig. 13 in which the portions are spot welded as at 53 together at spaced intervals around the periphery or tack welded as at 54 at spaced intervals. In either of the welding operations, care must be exercised to avoid the introduction of porosity to the metal at the point of welding.

In the modification of the invention shown in Fig. 14, the portion 17 extending along the portion 10 of the rim is omitted. The end of portion 15 may be tack welded if desired as at 55 at spaced intervals about the periphery to assure that the bead seat 4 will not move relative to the portion 10 of the rim. If this modified form of rim is formed one of the forming operations may be eliminated, thus reducing the number of operations required to form the rim. The U-shaped edge 30 of the rim is formed substantially as shown in Fig. 6 during the second forming operation, thus eliminating the forming operation shown by Figs. 7 and 8. The rim-mounting portion 11 is substantially formed and the bead-mounting means 2 is partially formed during the second forming operation as shown in Fig. 6. With the elimination of the portion 17 it is possible to roll by conventional rolling practices the partially formed edge as shown in Fig. 6 to the final shape of the bead-mounting portion 2 of the rim as shown in Fig. 14. Thus the forming step shown in Figs. 7 and 8 is not necessary and since the rolling operations are required in order to form the other edge of the band, both edges of the rim may be rolled simultaneously with no additional time required.

Preferably a valve assembly (not shown) is applied in airtight relationship to radially extending portion 13 of the rim-mounting surface. A valve in this position is readily accessible and provides a convenient means to inflate and the air pressure passes through the valve to the cavity or chamber formed between the bead-mounting means 2 and the rim-mounting means 11 and then through the joint between portions 10 and 17 into the air chamber formed by the rim and the tire mounted thereon to inflate the time. A valve assembly may be applied to the inner portion 10 of the rim if desired.

While certain representative embodiments and details have been shown for the purpose of illustrating the invention, it will be apparent to those skilled in this art that various changes and modifications may be made therein without departing from the spirit or scope of the invention.

Having thus fully described my invention, what I claim and desire to secure by Letters Patent of the United States is:

1. In forming from a cylindrical band a one-piece integral rim structure having bead seats and retaining flanges along the opposite edges thereof and including an integrally formed rim mounting surface positioned radially inwardly from one of the edge portions and integrally connected therewith, the method of forming the rim portion having the bead seat, retaining flange and integral mounting surface comprising the steps of applying pressure in an axial direction to one edge of said band to force the opposite edge of said band into engagement with forming means constructed and arranged to cause said second mentioned edge portion to curl in a direction first outwardly, then generally axially toward said first mentioned edge portion in spaced relation to the band, subsequently applying pressure to the first mentioned edge portion in an axial direction to upset the curled edge portion against forming means to form from the curled portion the rim mounting surface projecting radially inwardly from the inner periphery of the band and simultaneously partially form a portion of the bead seat from the curled edge portion, said bead seat lying radially outwardly of the rim mounting surface and on the opposite side of the band, and rolling said upset portion of the band in engagement with forming rolls so constructed and arranged to further shape the bead retaining flange and bead seat on the partially formed portion thereof.

2. In forming from a cylindrical band a one-piece integral rim structure having bead seats and retaining flanges along the opposite edges thereof and including an integrally formed rim mounting surface positioned radially inwardly from one of the edge portions and integrally connected therewith, the method of forming the rim portion having the bead seat, retaining flange and integral mounting surface comprising the steps of applying pressure in an axial direction to one edge of said band to force the opposite edge of said band into engagement with forming means constructed and arranged to cause said second mentioned edge portion to curl in a direction first outwardly then generally axially toward said first mentioned edge portion in spaced relation to the band, subsequently applying pressure to the first mentioned edge portion in an axial direction to upset the curled edge portion against forming means to form from the curled portion, the rim mounting surface projecting radially inwardly from the inner periphery of the band and simultaneously partially form a portion of the bead seat from the curled edge portion, said bead seat lying radially outwardly of the rim mounting surface and on the opposite side of the band, further upsetting the rolled edge portion to further form the bead retaining flange and bead seat, and rolling said upset portion of the band in engagement with forming rolls so constructed and arranged to further shape the bead retaining flange and bead seat on the partially formed portion thereof.

3. In forming from a cylindrical band a one-piece integral rim structure having bead seats and retaining flanges along the opposite edges thereof and including an integrally formed rim mounting surface positioned radially inwardly from one of the edge portions and integrally connected therewith, the method of forming the rim portion having the bead seat, retaining flange and integral mounting surface comprising the steps of applying pressure in an axial direction to one edge of said band to force the opposite edge of said band into engagement with forming means constructed and arranged to cause said second mentioned edge portion to curl in a direction first outwardly, then generally axially toward said first mentioned edge portion in spaced relation to the band, subsequently applying pressure to the first mentioned edge portion in an axial direction to upset the curled edge portion against forming means to form from the curled portion, the rim mounting surface projecting radially inwardly from the inner periphery of the band and simultaneously partially form a portion of the bead seat from the curled edge portion, said bead seat lying radially outwardly of the rim mounting surface and on the opposite side of the band, and rolling said upset portion of the band in engagement with forming rolls so constructed and arranged to further shape the bead retaining flange and bead seat on the partially formed portion thereof, and rolling said portion a second time in engagement with forming rolls to finally shape the bead retaining flange, seat and rim mounting portion.

4. In forming from a cylindrical band a one-piece integral rim structure having bead seats and retaining flanges along the opposite edges thereof and including an integrally formed rim mounting surface positioned radially inwardly from one of the edge portions and integrally connected therewith, the method of forming the rim portion having the bead seat, retaining flange and mounting surface comprising the steps of applying pressure in an axial direction to one edge of said band to force the opposite edge of said band into engagement with forming means constructed and arranged to cause said second mentioned edge portion to curl in a direction first outwardly, then generally axially toward said first mentioned edge portion in spaced relation to the band, subsequently applying pressure to the first mentioned edge portion in an axial direction to upset the curled edge portion against forming means to form from the curled portion, the rim mounting surface projecting radially inwardly from the inner periphery of the band and simultaneously partially form a portion of the bead seat from the curled edge portion, said bead seat lying radially outwardly of the rim mounting surface and on the opposite side of the band, and sizing the shaped band to a pre-determined size, and rolling said upset portion of the band in engagement with forming rolls so constructed and arranged to further shape the bead retaining flange and bead seat on the partially formed portion thereof.

5. The method as claimed in claim 4 in which the sizing comprises the steps of expanding the shaped band to oversize, then shrinking to the pre-determined size.

References Cited in the file of this patent

UNITED STATES PATENTS

| 1,715,266 | Ash | May 28, 1929 |
| 1,809,605 | Sauzedde | June 9, 1931 |
| 1,841,073 | Wiles | Jan. 12, 1932 |
| 2,068,947 | Frank | Jan. 26, 1937 |
| 2,268,838 | Lyon | Jan. 6, 1942 |

FOREIGN PATENTS

| 275,223 | Italy | June 14, 1930 |
| 10,905 | Great Britain | 1914 |
| 293,055 | Great Britain | July 5, 1928 |
| 608,068 | France | Apr. 10, 1926 |